(12) United States Patent
Huang et al.

(10) Patent No.: US 8,954,359 B2
(45) Date of Patent: Feb. 10, 2015

(54) DERIVING PREDICTIONS FROM DATA USING INFORMATION EXTRACTION AND MACHINE LEARNING

(75) Inventors: Yi Huang, Markt Schwaben (DE);
Xueyan Jiang, München (DE);
Maximilian Nickel, München (DE);
Volker Tresp, München (DE)

(73) Assignee: Siemens Aktiengesellschaft, Munich (DE)

( * ) Notice: Subject to any disclaimer, the term of this patent is extended or adjusted under 35 U.S.C. 154(b) by 254 days.

(21) Appl. No.: 13/481,215

(22) Filed: May 25, 2012

(65) Prior Publication Data

US 2013/0318012 A1 Nov. 28, 2013

(51) Int. Cl.
*G06F 15/18* (2006.01)
*G06N 99/00* (2010.01)
*G06N 7/02* (2006.01)

(52) U.S. Cl.
CPC .............. *G06N 99/005* (2013.01); *G06N 7/02* (2013.01)
USPC ........................................................ 706/12

(58) Field of Classification Search
CPC ................................ G06F 15/18; G06N 5/025
See application file for complete search history.

(56) References Cited

U.S. PATENT DOCUMENTS

2009/0192966 A1* 7/2009 Horvitz et al. ................. 706/46

OTHER PUBLICATIONS

Sarawagi "Information Extraction", Foundations and Trends in Databases, vol. 1, No. 3, 2007, pp. 262-377.*
Golding "A Bayesian hybrid method for context-sensitive spelling correction", 3rd Workshop Very Large Corpora, 1995, pp. 39-53.*
Tipping, Michael E. et al., "Probabilistic Principal Component Analysis," Journal of the Royal Statistical Society, Series B, 61, Part 3, 13 pages, Sep. 27, 1999.
Fensel, Dieter et al., "Towards LarKC: a Platform for Web-scale Reasoning," in ICSC, 6 pages, 2008.
"Deductive Reasoning," from Wikipedia, the Free Encyclopedia, http://en.wikipedia.org/wiki/Deductive_reasoning, 4 pages, May 25, 2012.
"Information Extraction," from Wikipedia, the Free Encyclopedia, http://en.wikipedia.org/wiki/Information_extraction, 5 pages, May 25, 2012.
"Machine Learning," from Wikipedia, the Free Encyclopedia, http://en.wikipedia.org/wiki/Machine_learning, 8 pages, May 25, 2012.

* cited by examiner

*Primary Examiner* — Li-Wu Chang
(74) *Attorney, Agent, or Firm* — King & Spalding L.L.P.

(57) ABSTRACT

Systems and methods are provided for deriving a prediction from existing data by utilizing information extraction and machine learning, wherein both approaches can be optimized independently from each other. Optionally, deductive reasoning may also be combined with information extraction and machine learning and may as well be optimized independently from the other two functionalities. The two or three functionalities may utilize at least one set of data and may (at least partially) process various sets of data. The combined approach may produce significantly improved results, and may be implemented in various technical fields, applications and use cases involving, e.g., data mining or processing of huge amounts of data. The disclosed systems and methods may be applicable for all kinds of technical systems, e.g., medical, genetic research, or industry and automation systems.

12 Claims, 1 Drawing Sheet

DERIVING PREDICTIONS FROM DATA USING INFORMATION EXTRACTION AND MACHINE LEARNING

TECHNICAL FIELD

The disclosure relates to a method and to a device for processing information, e.g., for predicting a relation. In addition, an according computer program product, a computer readable medium and a system are disclosed.

BACKGROUND

A multitude of interesting relations between entities are unknown in various scenarios or applications. A basic motivation is to predict such relations and dependencies. Such applications refer to, e.g., the medical domain, bioinformatics or social networks. Data analysis and support of decision making is a key objective based on the huge amounts of data available.

Three common approaches for deriving or predicting instantiated relations are information extraction, deductive reasoning and machine learning.

Information extraction (IE) uses sub-symbolic unstructured sensory information, e.g., in form of texts or images, and extracts statements using various methods ranging from simple classifiers to the most sophisticated Natural Language Processing (NLP) approaches (see, e.g., http://en.wikipedia.org/wiki/Information_extraction).

Deductive reasoning is based on a symbolic representation and derives new statements from logical axioms (see, e.g., http://en.wikipedia.org/wiki/Deductive_reasoning).

Machine learning (ML) can both support information extraction by deriving symbolic representations from sensory data, e.g., via classification, and can support deductive reasoning by exploiting regularities in structured data (see, e.g., http://en.wikipedia.org/wiki/Machine_learning).

SUMMARY

In one embodiment, a method for processing information comprises applying information extraction on a first set of data, applying machine learning on the first set of data or on a second set of data, and deriving a prediction based on the information extraction and the machine learning.

In a further embodiment, the machine learning is applied on the first set of data and on the second set of data. In a further embodiment, the information extraction is optimized. In a further embodiment, the machine learning is optimized. In a further embodiment, a prediction comprises a statement of an event or statement to be true.

In a further embodiment, a ranking is based on said prediction. In a further embodiment, a deductive reasoning is applied on the first set of data, on the second set of data, on the first and second set of data, on a third set of data, on the third and the first set of data, on the third and the second set of data or on the first, second and third set of data. In a further embodiment, at least the information extraction, the machine learning or the deductive reasoning is conducted based on triples "(s, p, o)", wherein s and o being entities and p being a predicate.

In a further embodiment, the prediction is determined based on $$P(X_{i,k}=1|S,KB)=\mathrm{sig}(\alpha_{i,k}),$$

wherein $\mathrm{sig}(\mathrm{in})=1/(1+\exp(-\mathrm{in}))$ is a logistics function, $\alpha_{i,k}$ is the true but unknown activation that specifies the probability of observing $X_{i,k}=1$ $X_{i,k}$ is a random variable if the k-th triple involving $e_i$ as a subject is one and zero otherwise S is a sensory information KB is a knowledge base.

In a further embodiment, $$\hat{\alpha}_i = U_d \mathrm{diag}\left(\frac{\lambda_j - \hat{\sigma}^2}{\lambda_j}\right) U_d^T f_i.$$

is used in the equation disclosed above to determine the probability for $X_{i,k}=1$.

In a further embodiment, sensory information is used for test entities and machine learning is trained on the knowledge base information.

In another embodiment, a device for processing information comprises a processing unit that is arranged for applying information extraction on a first set of data, applying machine learning on the first set of data or on a second set of data, and deriving a prediction based on the information extraction and the machine learning.

In another embodiment, a computer program product is loadable into a memory of a digital computer, which computer program product comprises software code portions for performing any of the methods disclosed above.

In another embodiment, a computer-readable medium is provided, in particular a storage of any kind, having computer-executable instructions adapted to cause a computer system to perform any of the methods disclosed above.

In another embodiment, a system comprises at least one device comprising such a computer-readable medium and/or computer-readable medium.

BRIEF DESCRIPTION OF THE DRAWINGS

Example embodiments will be explained in more detail below with reference to figures, in which.

DETAILED DESCRIPTION

Figure 1:
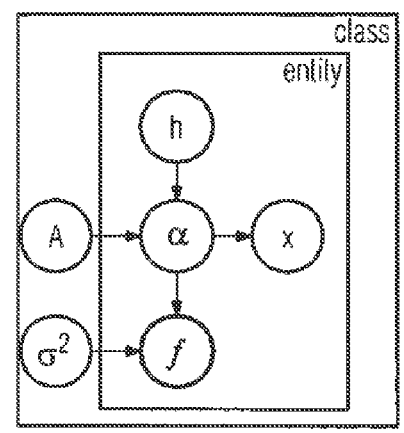
FIG. 1 shows a graphical plate model for the data generating process, according to an example embodiment.

In some embodiments, a method is provided for processing information, e.g., for data mining purposes within huge amounts of data, wherein information extraction is applied on a first set of data, wherein machine learning is applied on the first set of data or on a second set of data, wherein a prediction is derived based on the information extraction and the machine learning.

It is noted that the information extraction and the machine learning can be conducted independently from each other. For example, either of these functionalities can be conducted first. It is also a solution to conduct these functionalities (at least partially) in parallel.

Said information extraction may be based on sensory information (e.g., text and/or images) and/or a knowledge base. Hence the first set of data may comprise such sort of data.

Information extraction may refer to prediction statements for which textual or other data/sensory information is available.

Sensory information and knowledge base may be combined. For example, a probability of a statement derived from sensory information can be used to overwrite the default knowledge base value(s). Hence, it can be assumed to rely on the knowledge base unless the information extraction provides evidence that a relation is likely.

Relational machine learning can be used to capture statistical dependencies between statements.

Hence, the solution presented combines the functionalities information extraction, (deductive reasoning) and machine learning in an efficient way to allow for a more refined data mining.

Each functionality could be used in a modular way and each such module could be optimized independently from the other module(s).

Hence, the results derived by this approach combining at least two of the functionalities are better compared to results provided by each functionality alone. In addition, various types of information sources could be utilized—also based on the different functionalities. In addition, the solution presented provides excellent modularity and flexibility with regard to various use-cases.

It is noted that said prediction may be any relation(ship), statement or event derived from the data utilized. In this regard, said prediction does not necessarily refer to a future event to occur it may also refer to, e.g., a relation or triple found and/or derived from the data. However, the prediction may also indicate that, e.g., a relation(ship) may occur (in the future).

In an embodiment, the machine learning is applied on the first set of data and on the second set of data.

In another embodiment, the information extraction is optimized. the machine learning is optimized.

In particular, information extraction and machine learning can be optimized independently from each other.

In one embodiment the prediction is associated with a statement or an event to be or become true.

It is noted that due to the open world assumption it can be assumed that a statement or relation can either be true or unknown, but knot false. Hence, the approach presented herein can also be based on such open world assumption.

Hence, the prediction allows to assess such a statement of event, e.g., with regard to a certain likelihood.

In a further embodiment, a ranking is based on said prediction.

The statements or events may be ranked according to their likelihood to occur or to be true: For example, a list of most likely diseases can be produced based on several statements (diseases) to be true with regard to one or several sets of data. The result of extensive data operations based on several functionalities, e.g., information extraction, machine learning and/or deductive reasoning can be produced in a lucid manner.

In a next embodiment, a deductive reasoning is applied on the first set of data, on the second set of data, on the first and second set of data, on a third set of data, on the third and the first set of data, on the third and the second set of data or on the first, second and third set of data.

It is noted that the information extraction, the machine learning and the deductive reasoning can be conducted independently from each other. The above does hence not require a fixed sequence of conducting these functionalities. For example, either of these functionality can be conducted first. It is also a solution to conduct (at least two of) these functionalities (at least partially) in parallel.

In one embodiment, at least the information extraction, the machine learning or the deductive reasoning is conducted based on triples, in particular RDF-triples, "(s, p, o)", wherein s and o being entities and p being a predicate.

In an exemplary scenario, the functionalities information extraction, deductive reasoning and machine learning can be combined in a modular fashion, such that each step can be optimized independently: Triples can be extracted using information extraction, assuming that the extracted triples have associated certainty values (as an example, information extraction can be considered to be based on textual data; however, other kinds of data can be used as well). Optionally, deductive reasoning can be performed to derive the set of provably true triples. Machine learning can be used to exploit the dependencies between statements.

The predicted triples can then be ranked (ordered according to, e.g., their gain or certainty) for supporting a decision.

Advantageously, for all triples that cannot be proven to be true, a mechanism is provided that reflects the assumption that triples not known to be true might still be true.

Pursuant to another embodiment, the prediction is determined based on $$P(X_{i,k}=1|S,KB)=\text{sig}(\alpha_{i,k}),$$

wherein
sig(in)=1/(1+exp(−in)) is a logistic function,
$\alpha_{i,k}$ is the true but unknown activation that specifies the probability of observing $X_{i,k}=1$
$X_{i,k}$ is a random variable if the k-th triple
involving $e_i$ as a subject is one and zero otherwise
S is a sensory information
KB is a knowledge base.
According to an option, $$\hat{\alpha}_i = U_d \text{diag}\left(\frac{\lambda_j - \hat{\sigma}^2}{\lambda_j}\right) U_d^T f_i.$$

is used in the equation of claim 9 to determine the probability for $X_{i,k}=1$.

In yet another embodiment, sensory information is used for test entities and machine learning is trained on the knowledge base information.

This (further) reduces the computational efforts with regard to large amounts of data. In particular it is possible to obtain a sparse matrix F in case the sensory information is exploited only for the test entities and the machine learning component is trained only on the knowledge base information. The sparse setting can handle settings with millions of entities in each class and millions of potential triples for each entity.

Some embodiments provide a device for processing information comprising a processing unit that is arranged for
applying information extraction on a first set of data,
applying machine learning on the first set of data or on a second set of data,
deriving a prediction based on the information extraction and the machine learning.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

Some embodiments provide a computer program product directly loadable into a memory of a digital computer, comprising software code portions for performing the steps of the method as described herein.

Other embodiments provide a computer-readable medium, e.g., storage of any kind, having computer-executable instructions adapted to cause a computer system to perform the method as described herein.

Still other embodiments provide a system comprising at least one device as described herein.

The prediction of the truth value of a (instantiated) relation or statement (i.e., a link in an RDF graph, RDF: Resource Description Framework) is a common issue in diverse areas as information extraction (IE), deductive reasoning and machine learning.

For example, statements in form of (s, p, o) RDF triples can be considered, with s and o being entities and p being a predicate.

In information extraction (IE), the relation of interest may be derived from subsymbolic unstructured sensory data such as texts or images and the goal is to derive a mapping from sensory input to statements.

Based on an available set of facts and axioms deductive reasoning is used to derive additional statements that are true.

Relational machine learning (ML) also uses a set of true statements, but estimates the truth values of novel statements by exploiting regularities within the data.

Powerful methods have been developed for all three approaches and all have their respective strengths and shortcomings. For example, IE can only be employed if sensory information is available that is relevant to a relation, deductive reasoning can only derive a small subset of all statements that are true in a domain and relational machine learning is only applicable if the data contains relevant statistical structure.

Some embodiments combine these approaches in order to efficiently exploit the available information in a modular way. Hence, each approach, i.e., information extraction, deductive reasoning, machine learning, can be optimized independently to be combined in an overall system.

Herein, the strengths of all three approaches may be combined in a modular fashion, such that each step can be optimized independently:

Triples are extracted using information extraction, assuming that the extracted triples have associated certainty values (as an example, information extraction can be considered to be based on textual data; however, other kinds of data can be used as well).

Machine learning is used to exploit the dependencies between statements

Deductive reasoning is performed to derive the set of provably true triples.

The predicted triples are then typically ranked for supporting a decision. The complete system can be interpreted as a form of scalable hierarchical Bayesian modeling.

Figure 2:
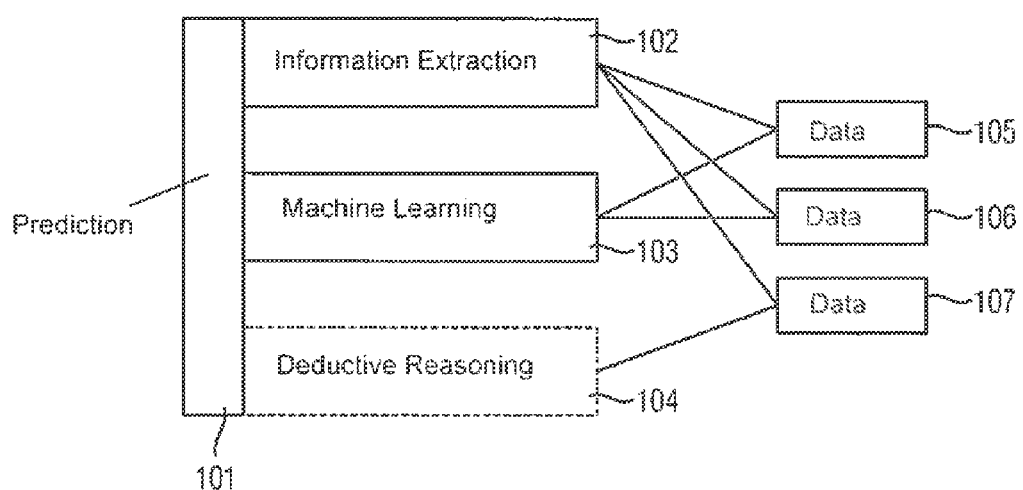
FIG. 2 shows a schematic diagram illustrating the prediction of relations by combining information extraction, machine learning and optionally deductive reasoning on one set of data or on various sets of data, according to an example embodiment.

FIG. 2 shows a schematic diagram illustrating a prediction 101 of relations by combining information extraction 102, machine learning 103 and—optionally—deductive reasoning 104 on one set of data or on various sets of data 105 to 107. The sets of data 105 to 107 can be used in various ways by the functionalities information extraction 102, machine learning 103 and deductive reasoning 104, e.g., all these functionalities may use a single data set or several data sets; in this regard, FIG. 2 only shows a particular example as how the data sets 105 to 107 are used by the functionalities 102 to 104.

Combining Sensory Information from Sensory Inputs
Relation Prediction from Sensory Inputs The derivation of relations from subsymbolic unstructured sensory information such as texts and images is known in the context of information extraction.

X is regarded as a random variable that has state one if the (s, p, o) statement of interest is true and is zero otherwise. It is assumed that the information extraction component can estimate $$P(X=1|S),$$

which is the probability that the statement represented by X is true given the sensory information S.

Otherwise no restrictions may apply to the information extraction part in the approach presented, e.g., it could be based on rules or on statistical classifiers. It is noted that information extraction may refer to prediction statements for which textual or other sensory information is available.

In applications textual information $text_s$ may be available describing the subject and textual information $text_o$ describing the object. Hence, it can be noted:

$$P(X=1|text_s,text_o). \qquad (1)$$

For example, $text_s$ may be derived from any available text source, e.g., wiki-pages.

In other applications, text could be used that describes a predicate $text_p$ or text that describes the relationship $text_{s,p,o}$ (e.g., a document where a user (s) evaluates a movie (o) and the predicate is p="likes"). An overview on state of the art information extraction methods for textual data can be found in [Sunita Sarawagi. Information extraction. Foundations and Trends in Databases, 1(3):261-377, 2008].

Relations from the Knowledge Base

In addition to sensory information, a knowledge base in form of a triple store of known facts forming an RDF graph is exemplarily assumed. Conceptually (all) triples are added that can be derived via deductive reasoning (the triples can either be inferred explicitly by calculating the deductive closure or on demand).

[Dieter Fensel, Frank van Harmelen, Bo Andersson, Paul Brennan, Hamish Cunningham, Emanuele Della Valle, Florian Fischer, Zhisheng Huang, Atanas Kiryakov, Tony Kyung it Lee, Lael Schooler, Volker Tresp, Stefan Wesner, Michael Witbrock, and Ning Zhong. Towards larkc: A platform for web-scale reasoning. In ICSC, pages 524-529, 2008] refers to deductive reasoning algorithms. It is noted that deductive reasoning may derive a small number of nontrivial statements of all actually true statements in a domain.

Further, the possibility is considered that the knowledge base contains some uncertainty, e.g., due to errors in the data base. Hence, for triples derived from the knowledge base KB, $$P(X=1|KB)$$

is a number close to one.

For all triples that cannot be proven to be true, it is assumed that P(X=1|KB) is a small non-negative number. This number reflects the assumption that triples not known to be true might still be true.

Combining Sensory Information and Knowledge Base

Sensor information and information from the knowledge base are combined. The term P(X=1|S, KB) expresses a probability that the statement presented by X is true given the knowledge base KB and sensory information S. The heuristic rule applied is as follows:

$$P(X=1|S,KB)=P(X=1|S) \text{ if } P(X=1|S)>P(X=1|KB)$$

$$P(X=1|S,KB)=P(X=1|KB) \text{ otherwise.}$$

Thus, the probability of a statement derived from sensory information overwrites the default knowledge base values, if the former is larger. Therefore, it is relied on the knowledge base unless information extraction provides substantial evidence that a relation is likely.

Adding Relational Machine Learning

In many applications there is information available that is neither captured by sensory information nor by the knowledge base. A typical example is collaborative preference modeling which exploits correlations between preferences of items. Such probabilistic dependencies cannot easily be captured in logical expressions and are typically not documented in textual or other sensory form.

Relational machine learning attempts to capture exactly these statistical dependencies between statements. Hereinafter, an approach is shown that is suitable to also integrate sensory information and a knowledge base.

Although there may be a number of heuristic ways combining sensory information and the knowledge base with machine learning, it is not straightforward to come up with consistent probabilistic models. Probabilistic generative models would require $P(S, KB|\{X\})$ where $\{X\}$ is the set of all random variables of all statements. Unfortunately, it is not clear how such a term could be derived. In the next subsections an approach is introduced that works with a simplified term $P(X|S, KB)$ and can be justified from a Bayesian modeling point of view.

Notation $(s, p, o)$ is considered triple statements where s and o are entities and p is a predicate. It is noted that a triple typically describes an attribute of a subject, e.g., (Jack, height, tall), or a relationship (Jack, likes, Jane).

Furthermore, $\{e_i\}$ is the set of known entities in the domain. Each entity may be assigned to exactly one class $c(i)$. This assumption will be further discussed below. $N_c$ describes a number of entities in the class c.

It is assumed that the set of all triples in which an entity $e_i$ can occur as a subject is known and is a finite, possibly large, ordered set and contains $M_{c(i)}$ elements. For each potential triple $(s, p, o)$ a random variable X is introduced, which is in state one when the triple is true and is I n state zero otherwise. More precisely, $X_{i,k}=1$ f the k-th triple involving $e_i$ as a subject is true and $X_{i,k}=0$ otherwise.

Thus, $\{X_{i,k}\}_{k=1}^{M_{c(i)}}$ is the set of all random variables assigned to the subject entity $e_i$.

Further, dependencies are assumed between all statements with the same subject entity.

A Generative Model

Following the independence assumptions, a separate model is trained for each class. Hence, in this section only the subset of statements is considered, which all have entities from the same entity class c.

The generative model is defined as follows: For each entity $e_i$ which is a subject in class c there is a d-dimensional latent variable vector $h_i$ which is generated as $$h_i \sim N(0,I) \tag{2}$$

from a Gaussian distribution with independent components and unit-variance.

Then for each entity $e_i$ a vector $\alpha_i=(\alpha_{i,1}, \ldots, \alpha_{i,M_c})^T$ can be generated, following $$\alpha_i=Ah_i \tag{3}$$

where A is a $M_c \times d$ matrix with orthonormal columns.

From the vector $\alpha_i$, the following probability can be derived:

$$P(X_{i,k}=1|S,KB)=\text{sig}(\alpha_{i,k}) \tag{4}$$

where $\text{sig}(\text{in})=1/(1+\exp(-\text{in}))$ is a logistic function. In other words, $\alpha_{i,k}$ is the true but unknown activation that specifies the probability of observing $X_{i,k}=1$.

It is noted that $\alpha_{i,k}$ is continuous within $-\infty<\alpha_{i,k}<\infty$ such that a Gaussian distribution assumption is reasonable, whereas discrete probabilities are bound by zero and one.

It is further assumed that $\alpha_{i,k}$ is not directly known, but there is a noisy version available for each $\alpha_{i,k}$ in the form of $$f_{i,k}=\alpha_{i,k}+\epsilon_{i,k} \tag{5}$$

where $\epsilon_{i,k}$ is independent Gaussian noise with a variance $\sigma^2$. $f_{i,k}$ can be calculated in the following way from sensory information and the knowledge base:

$$\hat{P}(X_{i,k}=1|S,KB)=\text{sig}(f_{i,k})$$

Sensory information and the knowledge base are transferred to $$f_{i,k}=\text{inv-sig}(\hat{P}(X_{i,k}=1|S,KB)), \tag{6}$$

where inv-sig is the inverse of the logistic function. Thus probabilities close to one are mapped to large positive $f$-values and probabilities close to zero are mapped to large negative $f$-values. The resulting F-matrix contains the observed data in the probabilistic model according to FIG. 1. Hence, FIG. 1 shows a graphical plate model for the data generating process.

Determining the Solution

It is noted that the generative model corresponds to the probabilistic PCA (pPCA, PCA: Principal Component Analysis) described in [Michael E. Tipping and Chris M. Bishop. Probabilistic principal component analysis. Journal of the Royal Statistical Society, Series B, 61:611-622, 1999]. The learning equations suggested therein can be used for this approach.

F is a $N_c \times M_c$ matrix of $f$-values for the class c and $$C=F^TF$$

is an empirical correlation matrix. The likelihood is maximized when $$\hat{A}=U_d(\Lambda_d-\sigma^2 I)^{1/2}R \tag{7}$$

where the d column vectors in the $N_c \times d$ matrix $U_d$ are the principal eigenvectors of C, with corresponding eigenvalues $\lambda_1, \ldots, \lambda_d$ in the $d \times d$ diagonal matrix $\Lambda_d$ and where R is an arbitrary $d \times N_c$ orthogonal rotation matrix. A practical choice for R is the identity matrix $R=I$. It is further noted that the mean is assumed to be equal to zero, which can be justified in, e.g., sparse domains.

The following term is determined $$\hat{\sigma}^2 = \frac{1}{M_c - d} \sum_{j=d+1}^{M_c} \lambda_j.$$

as well as $$\hat{\alpha}_i=\hat{A}M^{-1}\hat{A}^Tf_i. \tag{8}$$

with $f_i=(f_{i,1},\ldots,f_{i,M_c})^T$ being a vector of $f$-values assigned to $e_i$ and $M=\hat{A}^T\hat{A}+\hat{\sigma}^2 I$.

It is noted that the matrix $A_i$ is diagonal such that the inverse can be calculated as $$\hat{\alpha}_i = U_d \mathrm{diag}\left(\frac{\lambda_j - \hat{\sigma}^2}{\lambda_j}\right) U_d^T f_i. \quad (9)$$

$\hat{\alpha}_i$ is used in equation (4) to determine the probability for $X_{i,k}=1$, which is then, e.g., the basis for the ranking.

In addition, the term $$\mathrm{diag}\left(\frac{\lambda_j - \hat{\sigma}^2}{\lambda_j}\right)$$

refers to a diagonal matrix where the j-th diagonal term is equal to $$\frac{\lambda_j - \hat{\sigma}^2}{\lambda_j}.$$

Comments and Extensions
A Joint Probabilistic Model

There are many ways of looking at this approach, one example is a hierarchical Bayesian perspective. $\alpha_{i,k}$ may be predicted as a function of S and KB. In hierarchical Bayesian multitask learning, for a given entity $e_i$, the $\{\alpha_{i,k}\}_{k=1}^{M_{c(i)}}$ are not independent but mutually coupled and share a so-called statistical strength (see [Andrew Gelman, John B. Carlin, Hal S. Stern, and Donald B. Rubin. Bayesian Data Analysis. Chapman and Hall/CRC Texts in Statistical Science, 2 edition, 2003] for details). This is achieved by making the assumption that they are generated from a common multivariate Gaussian distribution. Thus, the approach presented herein can be interpreted as hierarchical Bayesian multitask learning which can scale up to more than a million tasks, i.e., potential statements per item.

It is noted that an independent model for each class can be trained and a joint probabilistic model over a complete domain can be obtained with $$P(\{X\},\{h\}|\{F\},\Theta) = \prod_c \prod_{i:c(i)=c} P(X_i | \alpha_i(h_i)) P(f_i | \alpha_i(h_i)) P(h_i).$$

$P(h_i)$ is given by the equation (2), where the dimension d might be dependent on the class $c(i)$ and $\alpha_i(h_i)$ is given by the equation (3). $P(X_i|\alpha_i(h_i))$ is given by the equation (4) (with $X_i=\{X_{i,k}\}_{k=1}^{M_{c(i)}}$) and $P(f_i|\alpha_i(h_i),\sigma_c^2)$ is given by the equation (5). Furthermore, $\{F\}$ is a set of F matrices for all classes and $\Theta$ is a set of all parameters, i.e., the A matrices and the $\sigma^2$ for all classes.

Each class can be modeled separately, such that, if the number of entities per class and potential triples per entity are constant, machine learning may scale linearly with the size of the knowledge base.

Finally, the set of all possible triples under consideration can be defined as follows: In most applications there is prior knowledge available about what triples should be considered. Also, typed relations constrain the number of possible triples.

In some applications it makes sense to restrict triples based on observed triples: The set of all possible statements in a class c to be all statements (s, p, o) can be defined where is in class c and where the triple (s, p, o) has been observed in the data for at least one element of sec.

Generalization to New Entities

An interesting scenario is when a new entity $e_n$ that was not considered in training becomes known. If the class of the new entity is known, the equation (8) can be used to calculate a new $\alpha_n$ for a new $f_n$ which corresponds to the projection of a new data vector in pPCA. In case the class of the new entity is unknown, $\alpha_n$ can be calculated for the different classes under consideration and the equation (5) can be used to calculate the class specific probability.

Aggregation

After training, the learning model only considers dependencies between triples with the same subject entity. Hereinafter will be shown how additional information can efficiently be used for prediction purposes.

Supplementing the Knowledge Base

An initial approach is to add a logical construct into deductive reasoning that explicitly adds aggregated information. For example, a triple (?Person, livesIn, Germany) can be predicted with some certainty from (?Person, bornIn, Germany). If the triple stored does not contain the latter information explicitly, but contains information about the birth city of a person, a rule as the following can be used (?Person, born in, Germany)←(?Person, bornIn, ?City)
∧ (?City, locatedIn, Germany)

and the derived information can be used in machine learning to predict the triple (?Person, livesIn, Germany).

Enhancing Information Extraction

Some aggregation happens at the information extraction level. As an example, a text describes a person (subject) and reveals that this person is a male teenager and another text reveals that a movie (object) is an action movie. Then, an information extraction system can learn that (Person, likes, Movie) is more likely when the keywords "male", "young" are present in the text describing the person and the keyword "action" is present in the test describing the movie.

The textual description can be enhanced using information from the knowledge base. If the knowledge base contains the statement (Person, gender, male) and (Person, age, young), the terms "male" and "young" can be added to the keywords describing the person. Similarly, if the knowledge base contains the statement (Movie, is Genre, Action), the term "action" can be added to the keywords describing the movie.

Multiple Class Memberships

It is noted that each entity can be uniquely assigned to a class or it can be assigned to more than one class. A straightforward approach is to define for each entity a most prominent class. For example, from the class assignments (Jack, typeOf, Student), (Jack, typeOf, Person), (Jack, typeOf, LivingBeing) it can be derived that the second one is the prominent class which is used in the probabilistic model. The other two class assignments (i.e., type-of relations) are simply interpreted as additional statements (Jack, typeOf, Student), (Jack, typeOf, LivingBeing) assigned to the entity. Hence, mixture approaches for dealing with multiple class assignments can be developed accordingly.

Scalability

Scalability of the three steps may be used: deductive reasoning, information extraction, and machine learning.

Deductive reasoning with less expressive ontologies scales up to billions of statements. Additional scalability can be achieved by giving up completeness. As mentioned above, each class can be modeled separately, such that, if the number of entities per class and potential triples per entity are constant, machine learning scales linearly with the size of the knowledge base. The expensive part of the machine learning part is the eigen-decomposition required by the equation (7). By employing sparse matrix algebra, this computation scales linearly with the number of nonzero elements in the matrix F. To obtain a sparse matrix F, the sensory information can be exploited only for the test entities and the machine learning component is trained only on the knowledge base information, i.e., $\hat{P}(x_{i,k}=1|S, KB)$ is replaced by $\hat{P}(x_{i,k}=1|KB)$ in the equation (6). It may then be assumed that $P(X=1|KB)=\epsilon$ is a small positive constant $\epsilon$ for all triples that are not and cannot be proven true. Next, inv-sig($\epsilon$) can be subtracted from F prior to the composition and inv-sig($\epsilon$) can be added to all $\alpha$. The sparse setting can handle settings with millions of entities in each class and millions of potential triples for each entity.

EXAMPLE

Associating Diseases with Genes

As the costs for gene sequencing are dropping, it is expected to become part of clinical practice. Unfortunately, for many years to come the relationships between genes and diseases will remain only partially known. The task here is to predict diseases that are likely associated with a gene based on knowledge about gene and disease attributes and about known gene-disease patterns.

Disease genes are those genes involved in the causation of, or associated with a particular disease. At this stage, more than 2500 disease genes have been discovered. Unfortunately, the relationship between genes and diseases is far from simple since most diseases are polygenic and exhibit different clinical phenotypes. High-throughput genome-wide studies like linkage analysis and gene expression profiling typically result in hundreds of potential candidate genes and it is still a challenge to identify the disease genes among them. One reason is that genes can often perform several functions and a mutational analysis of a particular gene reveal dozens of mutation cited that lead to different phenotype associations to diseases like cancer. An analysis is further complicated since environmental and physiological factors come into play as well as exogenous agents like viruses and bacteria.

Despite this complexity, it is quite important to be able to rank genes in terms of their predicted relevance for a given disease as a valuable tool for researchers and with applications in medical diagnosis, prognosis, and a personalized treatment of diseases.

Hence, information on known relationships between genes and diseases can be extracted from a Linked Open Data (LOD) cloud, in particular from Linked Life Data and Bio2RDF, forming triples (Gene, related_to, Disease). Textual information describing genes and diseases can be retrieved from corresponding text fields in Linked Life Data and Bio2RDF. For information extraction, a global classifier can be constructed that predicts the likelihood of a gene-disease relationship based on the textual information describing the gene and the disease. The system also considered relevant interaction terms between keywords and between keywords and identifiers. A number of most relevant keywords and interaction terms can be selected and the following use-case can be conducted:
 (a) Machine Learning (ML): A model is trained using only the gene disease relationship, essentially a collaborative filtering system, i.e. the equation (6) uses $\hat{P}(X_{i,k}=1|KB)$, no sensory information.
 (b) IE: The predictive performance based on IE according to the equation (1).
 (c) ML+IE: ML and IE are combined as suggested herein and equations (6) and (8) are applied.

As a result, the performance of the combination of ML and IE is effective and provides the best results.

EXAMPLE

Predicting Writer's Nationality in Yago

Another example can be based on the YAGO2 semantic knowledge base. Yago is derived from Wikipedia and also incorporates WordNet and GeoNames.

The goal of this example is to predict the nationalities of writers. Four different types of writers are exemplarily selected: American, French, German and Japanese. E.g., the triples for American writers are obtained with a SPARQL query:

```
SELECT ?writer ?birthPlace ?location WHERE {
    ?writer rdf:type ?nationality .
    ?writer yago:wasBornIn ?birthPlace .
    ?birthPlace yago:isLocatedIn ?location .
    FILTER regex(str( ?nationality ), " American_writers", "i")
}
```

An exemplary number of 440 entities representing the selected writers are determined. A number of 354 entities were elected with valid yago:hasWikipediaUrl statements. The following five models were built:
 (a) ML: The variables describing the writers' nationalities are considered (in total 4) and information about the city where a writer was born is added. In total, 233 variables were obtained; according to this example, the equation (6) uses $\hat{P}(X_{i,k}=1|KB)$, no sensory information.
 (b) IE: As textual source, the Wikipages of the writers are used. The terms 'German, French, American, Japanese' are removed; this resulted in 36943 keywords.
 (c) ML+IE: The knowledge base and the IE are combined as described above, then equations (6) and (8) are applied.
 (d) ML+AGG (AGG: aggregation): Geo-reasoning is used to derive the country where a writer is born from the city that a writer was born. This aggregate information was added as a statement to the writer. A high correlation between country of birth and the writer's nationality can be expected, but it turned out to be less than 100%.
 (e) ML+AGG+IE: As scenario (d) above, but with IE information added using the equation (1).

As a result of the example, it turned out that by including geo-reasoning, the performance can be improved. Hence, all three components, geo-reasoning, IE and machine learning efficiently work together.

CONCLUSIONS

The approach presented thus suggests combining, e.g., information extraction, deductive reasoning and relational machine learning to integrate all sources of available information in a modular way. Information extraction supplies evidence for the statements under consideration and machine learning models the dependencies between statements.

Thus even if it is not evident that a patient has diabetes just from information extraction from text, the solution presented has the ability to provide additional evidence by exploiting correlations with other statements, such as the patient's weight, age, regular exercise and insulin intake.

In addition, an entity may belong to more than one ontological class and addressed aggregation.

As a result, the combining information extraction with machine learning is effective in applications where a large number of relationships need to be predicted. Also, combining information extraction with machine learning and geo-reasoning provides beneficial results. In general, the approach is in particular effective when the information supplied via information extraction is complementary to the information supplied by statistical patterns in the structured data and if reasoning can add relevant covariate information.

Although aspects of the invention are described in detail by the embodiments above, it is noted that the invention is not at all limited to such embodiments. In particular, alternatives can be derived by a person skilled in the art from the exemplary embodiments and the illustrations without exceeding the scope of this invention.

What is claimed is:

1. A method for processing information, comprising:
applying information extraction on a first set of data,
applying machine learning on the first set of data or on a second set of data, and
deriving a prediction for each of a plurality of triples based on the information extraction and the machine learning,
wherein each triple is defined by (a) a pair of entities selected front a set of known entities $\{e_i\}$ and (b) a predicate, and
wherein the prediction is determined based on equation:

$P(X_{i,k}=1 \backslash S.KB)=\text{sig}(\alpha_{i,k})$, wherein:
sig(in)=$1/(1+\exp(-\text{in.}))$ is a logistic function,
$\alpha_{i,k}$ represents a true but unknown activation that specifies the probability of observing $X_{i,k}=1$,
$X_{i,k}$ equals 1 if the k–th triple involving $e_i$ as a subject is true and otherwise equals zero,
S is sensory information, and
KB is a knowledge base.

2. The method of claim 1, wherein the machine learning is applied on the first set of data and on the second set of data.

3. The method of claim 1, wherein the information extraction is optimized.

4. The method of claim 1, wherein the machine learning is optimized.

5. The method of claim 1, wherein a prediction comprises a statement of an event or statement to be true.

6. The method of claim 1, wherein a ranking is based on said prediction.

7. The method of claim 1, wherein a deductive reasoning is applied on one of: the first set of data, the second set of data, the first and second sets of data, a third set of data, the third and first sets of data, the third and second sets of data, or the first, second and third sets of data.

8. The method of claim 7, wherein at least one of the information extraction, the machine learning, and the deductive reasoning is conducted based on triples "(s, p, o)", wherein s and o are entities and p is a predicate.

9. The method according to claim 1, wherein the equation:

$$\hat{\alpha}_i = U_d \text{diag}\left(\frac{\lambda_j - \hat{\sigma}^2}{\lambda_j}\right) U_d^T f_i$$

is used to determine the probability for $X_{i,k}=1$,
wherein $U_d$ is a is sub-matrix including the first d columns of a unitary matrix U.

10. The The method of claim 1, wherein sensory information is used for test entities, and wherein machine learning is trained on the knowledge base information.

11. A device for processing information comprising a processing unit programmed to:
apply information extraction on a first set of data,
apply machine learning on the first set of data or on a second set of data, and
derive a prediction for each of a plurality of triples based on the information extraction and the machine learning,
wherein each triple is defined by (a) a air of entities selected from a set of known entities $\{e_i\}$ and (b) a predicate, and
wherein the prediction is determined based on equation:

$P(X_{i,k}=1 \backslash S,KB)=\text{sig}(\alpha_{i,k})$, wherein:
sig (in) =$1/(1+\exp(-\text{in}))$ is a logistic function,
$\alpha_{i,k}$ represents a true but unknown activation that specifies the probability of observing $X_{i,k}=1$,
$X_{i,k}$ equals 1 if the k–th triple involving $e_i$ as a subject is true and otherwise equals zero,
S is sensory information, and
KB is a knowledge base.

12. A non-transitory computer-readable medium storing computer-executable instructions configured, when executed by a processor, for:
applying information extraction on a first set of data,
applying machine learning on the first set of data or on a second set of data, and
deriving a prediction for each of a plurality of triples based on the information extraction and the machine learning,
wherein each triple is defined by (a) a pair of entities selected from a set of known entities $\{e_i\}$ and (b) a predicate, and
wherein the prediction is determined based on equation:

$P(X_{i,k}=1 \backslash S,KB)=\text{sig}(\alpha_{i,k})$, wherein:
sig(in) =$1/(1=\exp(-\text{in}))$ is a logistic function,
$\alpha_{i,k}$ represents a true hut unknown activation that specifies the probability of Observing $X_{i,k}=1$,
$X_{i,k}$ equals 1 if the k–th triple involving $e_i$ as a subject is true and otherwise equals zero,
S is sensory information, and
KB is a knowledge base.

* * * * *